United States Patent [19]

Kasper et al.

[11] Patent Number: 4,759,816
[45] Date of Patent: Jul. 26, 1988

[54] STRIPPABLE FILM FOR ADHESIVE COATING AND LAMINATING

[75] Inventors: Klaus B. Kasper; David R. Williams, both of Pulaski, N.Y.

[73] Assignee: Schoeller Technical Papers, Inc., Pulaski, N.Y.

[21] Appl. No.: 882,735

[22] Filed: Jul. 7, 1986

[51] Int. Cl.⁴ ............................ B44C 3/00; A61F 13/02
[52] U.S. Cl. ................................. 156/235; 156/231; 156/239; 156/230; 156/244.11; 156/246; 156/247; 156/249; 156/344; 427/147; 428/40; 428/352; 428/448; 428/451; 428/512; 428/914
[58] Field of Search ....................... 428/40–42, 428/448, 451, 512, 914, 352, 41, 42, 537.5, 513; 156/244.11, 246, 247, 249, 182, 230, 231, 235, 239, 344

[56] References Cited

U.S. PATENT DOCUMENTS

| | | | |
|---|---|---|---|
| 3,483,020 | 12/1969 | Giellerup et al. | 117/76 |
| 3,509,991 | 5/1970 | Hurst | 206/59 |
| 3,632,386 | 1/1972 | Hurst | 117/46 |
| 3,639,500 | 2/1972 | Muny et al. | 260/837 |
| 3,690,909 | 9/1972 | Finley | 428/40 |
| 3,993,815 | 11/1976 | Douek et al. | 428/40 |
| 4,398,985 | 8/1983 | Eagon | 156/233 |

OTHER PUBLICATIONS

"Sizing" Definition—Hàckh's Chem. Dict., 4th Ed., p. 614, 1969, McGraw-Hill.

*Primary Examiner*—George F. Lesmes
*Assistant Examiner*—James B. Monroe
*Attorney, Agent, or Firm*—Smith & Schnacke

[57] ABSTRACT

A strippable film for adhesive coating and laminating comprising:

a base paper, and an extrusion coated thermoplastic resin layer, wherein said film has the property that upon coating an adhesive onto said resin layer and assembling the adhesive coated strippable film with a base member, said base paper can be stripped from said resin layer and said resin layer can be subsequently stripped from said adhesive coating.

4 Claims, 2 Drawing Sheets

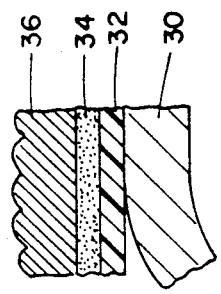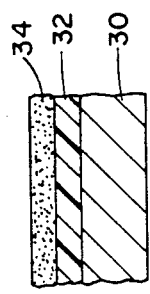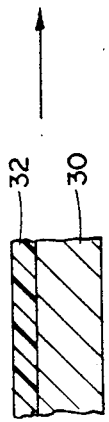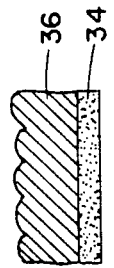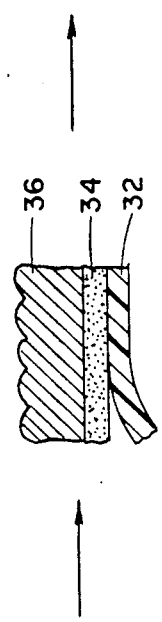

STRIPPABLE FILM FOR ADHESIVE COATING AND LAMINATING

BACKGROUND OF THE INVENTION

The present invention relates to a simplified process for forming an adhesive layer on a release liner for application of the adhesive to a base member. More particularly, it relates to a paper-backed release film useful in said process.

In many applications, adhesives are applied to a base member as a pre-formed film which is carried on a polymeric release liner. Due to the nature of the adhesives required in many of these applications, the adhesive layer cannot be formed directly on the release liner. Many adhesives are extrusion coated and/or cured at elevated temperatures at which the release liners, which are usually thermoplastic, are not dimensionally stable. At the elevated temperatures used to extrude and/or cure the adhesives, the release liner softens and stretches under the weight of the adhesive.

Currently in applications requiring the combination of a polymeric release liner and heat treated adhesives, the adhesive is coated onto a release paper and laminated to the film which functions as the release liner. The paper provides the necessary supporting substructure during the coating and curing of the adhesive. The release paper-adhesive-release liner composite is wound into a roll which may be stored until application to a base member whereupon the release paper is removed and the adhesive layer with the release liner is assembled with the base member in a transfer laminating operation.

U.S. Pat. No. 3,509,991 to Hurst teaches a release sheet and an adhesive structure embodying the same. This reference addresses the problem which occurs in marketing adhesive tape in roll form, i.e., the nonbacked adhesive sticks to the backside of the tape already in roll form. The problem is overcome by providing a release sheet with different release values on each side. The release sheet comprises a sheet of paper which is extrusion coated with polyethylene and then both sides are coated with a release agent. Pressure sensitive adhesive is then applied to the surface with the more difficult release properties and the resulting laminate is wound into roll form. When pulling the laminate from the roll, the adhesive sticks to the surface having the more difficult release properties rather than to the backside of the tape already on the roll. When the tape is used, the adhesive is applied to a desired surface, and the film-paper laminate is removed from the adhesive. The reference teaches that the polyolefin film and paper layer are firmly bonded to each other.

U.S. Pat. No. 4,398,985 to Eagon teaches a releasable self-detackifying laminate construction. The reference addresses the problem that once the paper stock is peeled off a laminate, a tacky pressure sensitive adhesive surface is exposed on the base stock. This tackiness makes further processing of the base stock by automated equipment next to impossible. The reference overcomes the problem by coating a film of a non-silicone containing polymer onto one side of the paper stock and then laminating this construction to an adhesive which has been coated onto a release liner. When the paper stock is peeled away, the polymer film will delaminate from the paper stock and be permanently affixed to the adhesive coating. The resulting substrate has a detackified adhesive surface which can be further used or processed either by hand or by automated equipment.

DEFINITIONS

The term "base member" as used herein refers to a number of products to which the adhesive layer and accompanying release liner may be applied including but not limited to signs, labels, tags, credit, business or membership cards, etc.

The term "base paper" refers to the paper substrate upon which the release liner is formed and which supports the liner in the presence of the heated adhesive.

The term "dual strippable" refers to the property of the release liner wherein the release liner is strippable from the base paper and subsequently strippable from the adhesive film after application of the adhesive film to a base member.

The term "adhesive coated member" refers to the adhesive backed intermediate formed in accordance with the present invention prior to application of the adhesive to a base member.

SUMMARY OF THE INVENTION

The present invention provides a strippable film for adhesive coating and laminating comprising a base paper and an extrusion coated thermoplastic resin film on one surface of said base paper, the adherence of said extrusion coated resin film to said base paper being adjusted such that said resin film is strippable from said base paper. More particularly, the adherence of the resin film to the base paper is adjusted such that upon application of an adhesive to the surface of the resin film at an elevated temperature, and assembly of the adhesive with a base member, the base paper is strippable from the resin film and the resin film is subsequently strippable from the adhesive layer.

The present invention also provides a simplified process for applying an adhesive coated backing to a base member which comprises providing a base paper having a strippable extrusion coated thermoplastic resin layer on one surface thereof, applying an adhesive coating to said thermoplastic resin layer under conditions involving the heating of said adhesive layer to form an adhesive coated member, assembling said adhesive coated member with a base member, and removing said base paper.

The present invention also provides an adhesive coated member having a dual strippable release liner. The adhesive coated member comprises a base paper, an extrusion coated thermoplastic resin, and an adhesive coating. The release force between the adhesive coating and the thermoplastic resin layer is greater than the release force between the thermoplastic resin layer and the base paper. In use, this differential release capability allows the film to be coated with an adhesive and assembled with a base member, the base paper to be stripped from the film, and the film to be subsequently stripped from the adhesive layer.

BRIEF DESCRIPTION OF THE DRAWINGS

FIGS. 2A-2E illustrate a process in accordance with the present invention.

DETAILED DESCRIPTION OF THE INVENTION

Figure 1C:
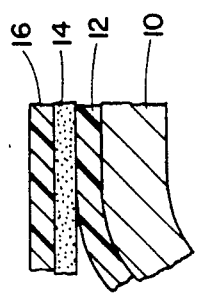
FIGS. 1A-1E illustrate a prior process for coating an adhesive and laminating the adhesive to a base member.

The present invention provides a strippable film for adhesive coating and laminating comprising base paper, and an extrusion coated thermoplastic resin layer, wherein the film has the property that upon coating an adhesive onto the resin layer and assembling the adhesive coated strippable film with a base member, the base paper can be stripped from the resin layer and the resin layer can be subsequently stripped from the adhesive coating.

The selective release characteristics of the thermoplastic resin layer, which allow the base paper to be stripped from the resin layer which can subsequently be stripped from the adhesive coating, are achieved by controlling a number of variables. The main object is to prevent the thermoplastic resin layer from infiltrating the pores of the base paper on processing, i.e., upon application of the thermoplastic resin film to the base paper and upon subsequent application of the adhesive coating to the thermoplastic resin layer.

The selective release characteristics of the thermoplastic resin layer are to a large extent achieved through selection of the resin, limiting its extrusion temperature and controlling the penetration of the base paper by the coated resin. Extrusion coating conditions are discussed later. Useful thermoplastic resins include low-density polyethylene, medium-density polyethylene, high-density polyethylene, linear low-density polyethylene, polypropylene, polycarboxylate, poly(methyl methacrylate), poly(ethylene terephthalate), poly(butylene terephthalate), polyurethane, copolyester, ionomers, thermoplastic elastomers, and copolymers of many of these resins. A particularly useful thermoplastic resin is a polyolefin. Preferred polyolefins are polyethylene and polypropylene. These resins may contain colored pigment for final product identification purposes.

The selective release characteristics of the thermoplastic resin layer can be partially achieved by controlling the paper density. Because an object of the present invention is to prevent the thermoplastic resin layer from infiltrating the pores of the base paper during processing to an extent which would prevent the base paper from being stripped from the resin layer, a useful paper has a high density or low porosity. A useful paper has a density of at least 0.75 g/cm$^3$. A preferred paper has a density of about 0.95 to 1.12 g/cm$^3$. Useful papers typically have a thickness of about 3.0 to 12 mils. Particularly useful papers are 3–5 mils thick with a density of 1.0 g/cm$^3$.

Adhesion of the thermoplastic resin layer to the base paper can also be controlled by the addition of a release agent or an antioxidant to the thermoplastic resin.

The selective release characteristics of the thermoplastic resin layer from the base paper are also partially achieved through treating the base paper with various sizing agents and/or release agents which prevent the thermoplastic resin layer from penetrating the base paper upon processing. A typical sizing agent is starch but other sizing agents such as PVA, Scripset (a product of Monsanto Company), gelatin, and soy protein are also useful. Typically, the sizing agents are applied at a rate of about 60 to 120 pounds/ton. The base paper must be sized properly to ensure the proper release characteristics of the thermoplastic resin layer preferably without any fiber contamination in the thermoplastic resin layer. Fiber contamination represents an aesthetic fault which can lead to irregular stripping of the base paper during processing.

Release agents can also be incorporated into the base paper to reduce the adherence of the thermoplastic resin layer to the base paper. Useful release agents include Quilon (Chrome Complexes) (a product of E. I. DuPont deNemours & Co.) and Scotchban fluorocarbons (a product of 3M). A preferred release agent is Quilon. Typically, the release agents are incorporated into the base paper at about 0.1 pound /3,000 sq. ft.

The selective release characteristics of the thermoplastic resin layer from the adhesive coating can be achieved by controlling the surface energy of the resin layer and/or addition of release agents into the thermoplastic layer.

The aforementioned variables plus other process variables to be discussed later all contribute to achievement of the selective release characteristics of the strippable film of the present invention. The release force between the adhesive coating and the thermoplastic resin layer has to be greater than the release force between the thermoplastic resin layer and the base paper. The selective release characteristics allow the base paper to be stripped from the thermoplastic resin layer and the thermoplastic resin layer to be subsequently stripped from the adhesive coating. The resulting release force of the base paper from the thermoplastic resin layer is about 5 to 200 g/in (90° peel) while a preferred release force is about 20 to 80 g/in. This release force is limited on the low end by premature separation of the thermoplastic resin layer and the base paper. The resulting release force of the thermoplastic resin layer from the adhesive coating is about 10 to 250 g/in while a preferred release force is about 25 to 100 g/in. This release force is limited on the low end by the release force of the resin layer from the base paper and on the upper end by adhesive tack and thermoplastic resin strength.

The term "base member" refers to a wide variety of products to which an adhesive coated strippable film may be applied. Examples of base members include signs, labels, tags, and credit, business or membership cards.

A release coating may be interposed between the thermoplastic resin layer and the adhesive coating to contribute to the achievement of selective release characteristics between the thermoplastic resin layer and the adhesive coating. A release coating is particularly useful when pressure sensitive adhesives are used. A preferred release coating is a conventional silicone release coating.

FIG. 1 illustrates a prior art process for coating an adhesive and laminating the adhesive to a base member. FIG. 1A shows a paper 10 carrying a coating 12 (e.g. a polymer coating, a silicone coating, or a clay coating) after coating with an adhesive 14. Due to the nature of the adhesive required in many applications, the adhesive cannot be coated directly onto the release coating but instead must be coated onto the coated paper as shown in FIG. 1A. The release film 16 is applied after application of the adhesive 14 while the adhesive 14 is supported on the paper as shown in FIG. 1B. FIG. 1B illustrates the adhesive-coated coated paper after lamination of release film 16. The coated paper provides the necessary supporting substructure to prevent the release film 16 from stretching in the presence of the heated adhesive coating 14.

Figure 1B:
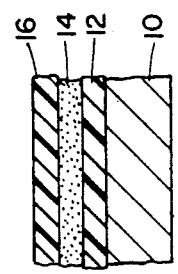
Figure 1A:
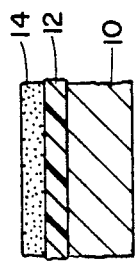
Figure 1E:
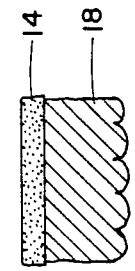
Figure 1D:
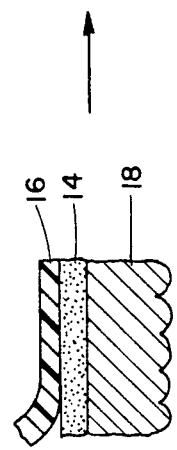

If desired, the laminate of FIG. 1B can be wound up and stored in the form of a roll which is unwound when transfer of the adhesive to the base member is desired. The coated paper is then stripped from the adhesive 14 as shown in FIG. 1C which is then applied to a base member 18. FIG. 1D illustrates the adhesive coated release film after application to base member 18. The release film 16 can be removed subsequently as shown in FIG. 1D. The adhesive coated base member is ready for application to an appropriate substrate as shown in FIG. 1E.

In accordance with the present invention, the adhesive is coated directly on the strippable film.

FIG. 2A illustrates a base paper 30 after extrusion coating of a thermoplastic resin layer 32. As mentioned earlier, the selective release characteristics of the strippable film are also achieved by controlling the coating conditions. The extrusion coating temperatures can be varied somewhat in contributing to the achievement of the controlled release forces. By employing low extrusion temperatures, the resin sets up faster on the surface of the base paper, and does not penetrate the base paper surface and increase adhesion. Useful extrusion coating temperatures will vary with the nature of the resin. For polyethylene, extrusion temperatures of about 425° to 575° F. are used. Of course, higher extrusion temperatures can be used if the resin is allowed to cool before it is brought into contact with the base paper. Thus, by allowing the extruded resin layer to fall a distance before contacting the base paper such that it cools, its penetration into the base paper can be controlled.

Typically, the extrusion coated thermoplastic resin layer has a thickness of about 0.5 to 10 mils. In a preferred embodiment, the extrusion coated thermoplastic resin layer has a thickness of about 1.5 to 3.5 mils.

FIG. 2B illustrates the thermoplastic resin coated base paper after coating an adhesive 34 onto the thermoplastic resin layer 32. The process of the present invention allows direct adhesive coating of the strippable film. The strippable film and process of the present invention can be used in conjunction with a variety of adhesives requiring elevated temperatures to apply or cure the adhesive. Both pressure-sensitive and hot melt adhesives can be used. Typical examples are Rhoplex (a product of Rohm and Haas Company) and Gelva acrylic based adhesives (products of Monsanto Co.). Useful adhesive drying and/or curing temperatures are about 225° F. Preferred adhesive drying or curing temperatures are about 180° to 250° F.

The adhesive coated strippable film is laminated to a base member 36 as shown in FIG. 2C and the base paper 30 is removed. Thereafter, at the time of application of the base member to a supporting substrate, thermoplastic resin layer 32 can be removed as shown in FIG. 2D. FIG. 2E illustrates the adhesive coated base member after removal of the thermoplastic resin layer 32 and which is ready for application to the desired substrate.

In application of pressure-sensitive adhesives, a release coating may be desired between the thermoplastic resin layer 32 and adhesive coating 34. Such a coating can be applied in any conventional manner.

The present invention is particularly useful in manufacturing printed adhesive overlays or "decals" for signs or the like as more fully illustrated by the following non-limiting example.

EXAMPLE

A base paper was prepared by refining a mixture of 60% softwood Kraft and 40% hardwood Kraft to a Canadian Standard Freeness of 430 to 450, adding to the refined pulp 12 pounds per ton of a cationic starch (Cato 15) and the paper formed and dried in the paper machine. While still on the paper machine, the paper was run through two size presses followed each time by drying. At both size presses, the paper was treated with an aqueous solution of 6% paper coating starch. The total pick up of starch surface size on both size presses was about 5.2 g/m$^2$.

The paper was machine calendered on the paper machine to give a smooth surface. The Sheffield smoothness was about 40 to 50. The basis weight of the paper was 110 g/m$^2$, the caliper 4.3 mils and the density 1.0 g/cm$^3$.

The paper produced as above was extrusion coated at about 300 ft./min. on one side with 3 mils of Eastman polypropylene resin 4E31. A masterbatch NC-3340-C containing a yellow pigment obtained from Plastic Color Chip Inc. was blended with the polypropylene at 1.5% loading imparting a yellow color to the polypropylene film. The melt temperature from the extruder was 550° F., the glossy chill roll was kept at 60° F. and the nip pressure from the pressure roll was 120 pounds per lineal inch. The release force of the strippable film from the paper base as measured in the laboratory ranged from 32 to 44 g/inch and averaged 39 g/inch.

In a second converting operation, the glossy side of the yellow film was coated with a solvent based silicone coating so that it would have suitable release from pressure sensitive adhesives. In a third converting operation, the silicone coated film was coated with Monsanto's solvent based Acrylic adhesive Gelva 737. The adhesive was applied with a knife over roll application and was dried and cured in a two zone oven at 150° F. and 225° F., with a dwell time of about 2 minutes in each zone. The dry coating weight was 24 g/m$^2$. When the adhesive coated strippable film leaves the drying oven, it is laminated to a poster or sign and the base paper is stripped from the film prior to winding the laminate into a roll.

Having described the invention in detail and by reference to preferred embodiments thereof, it will be apparent that modifications and variations are possible without departing from the scope of the invention defined in the appended claims.

What is claimed is:

1. A process for applying an adhesive to a base member which comprises the steps of:
    extruding a thermoplastic resin layer directly onto the surface of a sized base paper having a density of at least 0.75 g/cm$^3$ and limiting the degree of penetration of said base paper by said thermoplastic resin layer by employing an extrusion temperature at which said resin sets rapidly after contacting the surface of the base paper such that said base paper can subsequently be stripped from said thermoplastic resin layer, and the release force between said base paper and said resin layer is 5 to 200 g/in.;
    applying an adhesive coating to a laminate of said base paper and said extrusion coated thermoplastic resin layer such that said thermoplastic resin layer is interposed between said base paper and said adhesive coating, the release force between said adhesive and said resin being 10 to 150 g/in. and being greater than the release force between said resin and said base paper;

applying said adhesive coated laminate to a base member;

stripping said base paper from said thermoplastic resin layer; and stripping said thermoplastic resin layer from said adhesive coating to reveal said adhesive coating.

2. The process of claim 1 wherein said thermoplastic resin layer is a polyolefin.

3. The process of claim 2 wherein said thermoplastic resin layer is polypropylene.

4. The process of claim 3 wherein said thermoplastic resin layer is pigmented.

* * * * *